United States Patent [19]

Bloch

[11] Patent Number: 4,518,307

[45] Date of Patent: May 21, 1985

[54] COMPLIANT ROBOT ARM ADAPTER ASSEMBLY

[75] Inventor: Joseph T. Bloch, Seattle, Wash.

[73] Assignee: The Boeing Company, Seattle, Wash.

[21] Appl. No.: 426,357

[22] Filed: Sep. 29, 1982

[51] Int. Cl.³ ............................................. B66C 23/00
[52] U.S. Cl. ....................................... 414/729; 901/45
[58] Field of Search .................. 901/45; 414/734, 735, 414/729, 589; 33/169 C, 185 R, 172 D; 248/183, 184, 550, 179, 583; 74/5 F, 5.5

[56] References Cited

U.S. PATENT DOCUMENTS

| 3,885,295 | 5/1975 | Engelberger et al. | 901/45 X |
| 4,270,393 | 6/1981 | Osborne et al. | 248/179 X |
| 4,332,066 | 6/1982 | Hailey et al. | 901/45 X |

Primary Examiner—Robert J. Spar
Assistant Examiner—Dennis Williamson
Attorney, Agent, or Firm—William C. Anderson

[57] ABSTRACT

A five axis compliant device for use as an industrial robot end-of-arm tooling. This device compensates for the inherent positioning and repeatability inaccuracies found in a robot and therefore allows the robot to be applied to work requiring high accuracies such as screw and nut insertion, close tolerance pin insertion and hole deburring.

7 Claims, 4 Drawing Figures

COMPLIANT ROBOT ARM ADAPTER ASSEMBLY

TECHNICAL FIELD

The present invention relates in general to robotics and more particularly to a compliant adapter assembly which facilitates the use of tools by a robot.

BACKGROUND OF THE INVENTION

Recently, robots with articulatable appendages or arms have seen increasing use. One reason is that robots have manipulative arms which are able to perform certain routine manual or manipulative tasks using accessories such as tools in an efficient and precise manner. For example, robots have shown dexterity in performing such exemplary tasks as screw and nut driving, hole deburring and tasks or work on objects involving close tolerances such as, e.g., the insertion of a pin into a bore.

However, using a robot for the above exemplary tasks or operations requires that the manipulative arm of the robot be repeatedly positioned exactly over the work. Otherwise, the robot will not be able to perform such precise operations. A need therefore exists for an assembly adapted to be used in conjunction with the manipulative arm of the robot which compensates for robot positioning and repeatability inaccuracies when the robot is performing a task.

SUMMARY OF THE INVENTION

The present invention comprises a compliant adapter assembly useful with an articulatable robot arm requiring an accessory. The preferred embodiment of the compliant adapter assembly of the present invention has five degrees of freedom with which positioning and repeatability inaccuracies of the robot, during task performance, may be compensated. It is mounted to the robot arm and is provided with a plate having an opening within which is positioned a first ring. The first ring is pivotably connected to the plate and a second ring is pivotably connected to the first ring. The first ring is translatable with respect to the plate but is biased towards a nominal position. The second ring is also translatable with respect to the first ring and biased towards a nominal position. The second ring supports a motor which is biased towards a position which is substantially perpendicular to the plate. Finally, the output shaft of the motor carries a translatable holder for attaching an accessory to the present compliant adapter assembly.

DETAILED DESCRIPTION OF THE PREFERRED EMBODIMENT

Figure 1:
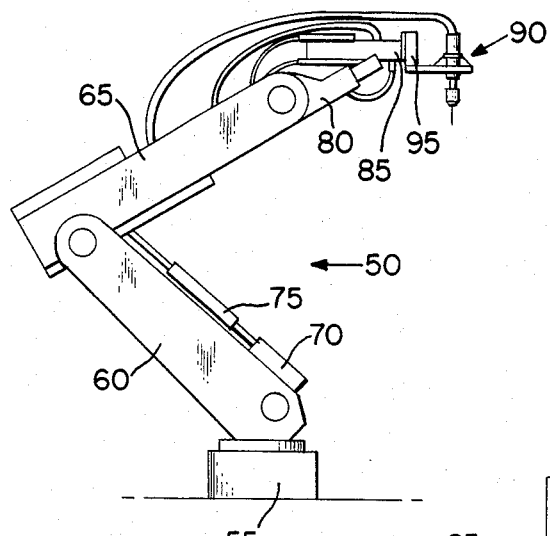
FIG. 1 illustrates a preferred embodiment of the present invention in conjunction with a conventional robot having articulatable arms.

Turning now to the preferred embodiment of the present invention illustrated in FIG. 1, the present compliant robot arm adapter assembly is shown in combination with a conventional robot 50. The robot 50 is capable of performing tasks such as, for example, the exemplary operations of screw and nut driving, insertion of a pin into a bore wherein there is a close tolerance between the pin and the bore, hole deburring or other manipulative tasks where the operation requires at least one articulatable arm. The details of the robot are not germane to the present invention. However, in the interest of completeness the robot 50 will be briefly described.

The robot 50 is provided with a rotatable support 55 to which is pinned a first articulatable arm 60. The first arm 60 carries a second pivotable articulatable arm 65 which is controlled by means of one or more hydraulic actuators 70, 75. A third pivotable articulatable arm 80 is carried by the arm 65 by means of pins and is provided with a manipulative rotatable robot arm or a wrist 85. A compliant robot arm adaptor assembly 90 of the present invention, having five degrees of movement or freedom, is fastened to the robot wrist 85, as is illustrated in FIG. 1.

The compliant robot arm adaptor assembly 90 of the present invention is attached to the wrist 85 by means of a mounting bracket 95. A mounting plate 100 is affixed to the mounting bracket 95 and is provided with an opening or a bore 105. Within the bore 105 is provided a first pivotable and translatable ring 110 which is pivotable with respect to the mounting plate 100.

The first ring 110 is mounted to the mounting plate 100 by means of a first pair of pins 115 that are affixed to the first ring 110. The other ends of the pins 115 are insertable within a first set of bores 120 formed within the mounting plate 100 and alignable with the first pair of pins 115. A slight clearance exists between the pins 115 and the first set of bores 120 enabling the pins to translate therein. A compressible spring 125 is mounted about each of the pins 115 between the first ring 110 and the mounting plate 100 thereby enabling translation of the first ring 110 with respect to the mounting plate 100 but providing the necessary compliance or bias of the first ring 110 towards a normal or nominal state wherein the springs 125 are relaxed and not compressed, as illustrated in FIG. 2.

A second pivotable and translatable ring 130 is mounted within the first ring 110. The second ring 130 is provided with a second pair of pins 135 disposed at a right angle to the pins 115. The second pair of pins 135 are affixed to the second ring 130 and extend towards a second set of bores 140 that are formed within the first ring 110 and which are coaxial with the second pair of pins 135. Again, the second pair of pins 135 are insertable and translatable within the second set of bores 140 due to a clearance that exists between the second pair of pins 135 and the second set of bores 140. A second set of compressible springs 145 are mounted about the second pair of pins 135 thereby allowing lateral movement of the second ring 110 with respect to the first ring but tending to return the second ring to a nominal position illustrated in FIG. 2.

Figure 3:
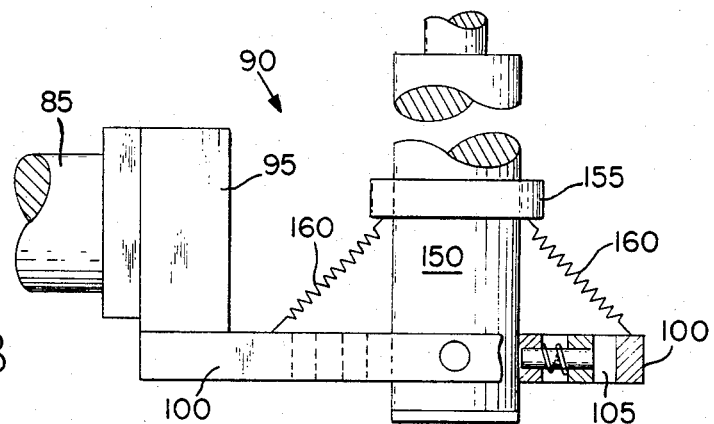
FIG. 3 is a side view of the preferred embodiment illustrated in FIG. 2.

Referring now to FIG. 3, a motor 150 is affixed to the second ring 130 by means of a suitable fastener such as one or more screws (not shown). The motor 150 is preferably a geared down fluid or pneumatic motor but may also be a geared down hydraulic, electric or any suitable motor. The motor 150 may be used in screw and nut driving, hole deburring or any of the other tasks capable of being performed by any conventional robot. A motor is not usually required to insert a pin into a bore, as will be obvious to the skilled artisan.

Figure 2:
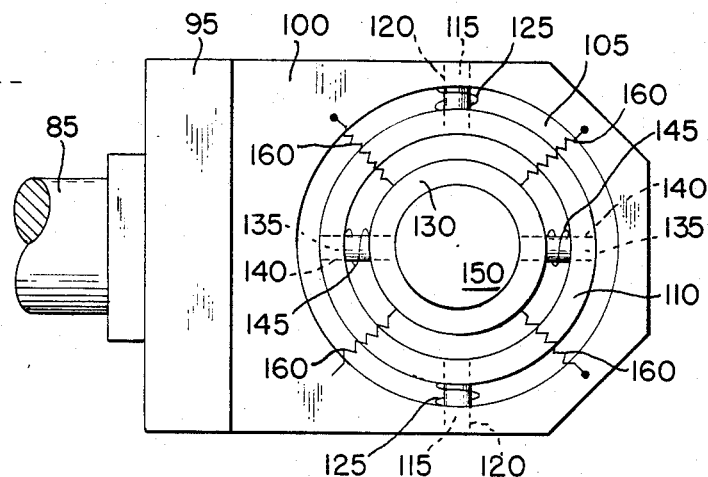
FIG. 2 is a plan view of the preferred embodiment of the present invention.

Clamped to the upper portion of the motor 150 is a ring 155 having a plurality of orthogonally arranged tension springs 160 extending therefrom, as illustrated in FIG. 2. The springs 160 are each suitably attached at one end to the ring 155 and at another end to the mounting plate 100. The springs 160 tend to restore the motor 150 to a position which is substantially perpendicular to the mounting plate 100.

The first and second pivotable and translatable rings 110, 130 provide the first four of the five degrees of freedom enjoyed by the present invention. The fifth degree of freedom is provided by a cylindrical holder 165 useful for attaching conventional accessories such as tools or articles (not shown) that are to be used during the tasks to be performed by the robot 50. The holder 165 is a cylindrical housing carried by or connected to the output shaft 170 of the motor 150. The shaft 170 is provided with a pin 175 which extends towards an elongated slot 180 formed within the housing of the holder 165 (see FIG. 4). The output shaft 170 loosely fits within an internal bore 185 formed within the holder 165 thereby allowing the holder 165 to slide upon the shaft 170. The pin 175 within the slot 180 acts as a limit on the motion of the holder 165. A compressible spring 190, having a spring constant determined by choice, is mounted about the motor shaft 170 between the lower surface 195 of the motor 150 and the upper surface 200 of the holder 165. The spring 190 tends to bias the holder 165 to a position wherein the pin 175 contacts the upper inner surface of the slot 180 (see FIG. 4). A bore 205 formed at the lower portion of the housing of the holder 165 may be used to attach the accessories to be used during the tasks performed by the robot 50. For example, the attachment bore 205 may be used for attaching a tool or it may be used to support an article to be inserted into another body such as, e.g., a pin into a bore.

The operation and use of the above-described preferred embodiment should be clear to the skilled artisan. However, in the interest of clarity a short description of the use and operation of the present invention will be given.

Figure 4:
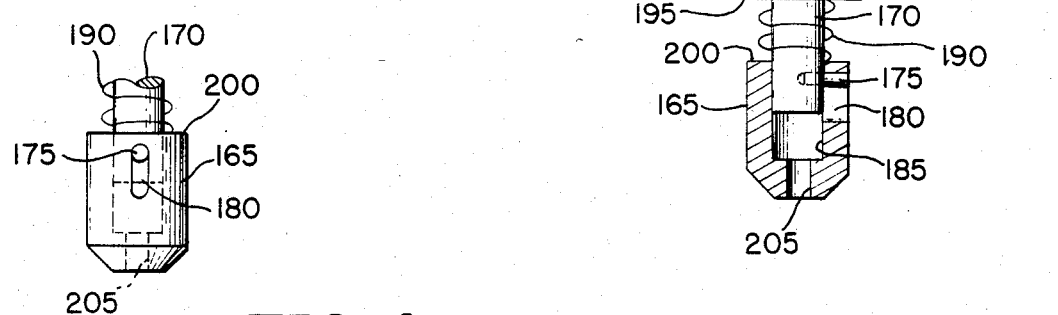
FIG. 4 is an isolated view of a portion of the preferred embodiment of the present invention.

In use, the articulatable arm of the conventional robot 50 is capable of performing manual tasks very precisely. However, there may be some misalignment between the robot wrist 85 and the object upon which the robot is to repeatedly perform the task. For example, if the robot is to perform the task of screw or nut driving there may be a misalignment between the wrist 85 and the bore into which the screw or nut is to be secured. The present invention repeatedly compensates for misalignments through the provision of an adapter assembly having five degrees of freedom. The first ring 110 provides two degrees of freedom because it is pivotable and translatable with respect to the mounting plate 100. The first set of springs 125 tend to return the first ring 110 to its original position thereby providing compliance along the axis defined along the first pair of pins 115. The next two degrees of freedom and compliance are provided by the second ring 130 which is pivotable about and translatable along an axis that is perpendicular to the axis defined by the first pair of pins 115. The second ring 130 may pivot about the second pair of pins 135 and may also translate along the axis coaxial with the second pair of pins 135. Again, the second set or springs 145 tend to urge the second ring 130 to its original position, as can be seen in FIG. 2. The fifth degree of freedom is provided by means of the holder 165 for the accessories needed during the performance of the task by the robot 50. As can be seen in FIGS. 3 and 4, the holder 165 may translate along the motor shaft 170 and is biased or is compliant along the axis defined by the shaft 170. Finally, it should be noted that the tension springs 160 fastened to the motor 150 tend to maintain the motor 150 and thus the holder 165 in a position which is substantially perpendicular to the mounting plate 100. The springs 160 tend to provide a flexibility for the present compliant robot arm adapter assembly 90 and yet still allow the assembly 90 to be readily controlled by the articulatable manipulative wrist 85 of the robot 50.

It will be understood that various changes can be made in the embodiment in the above described preferred embodiment of a compliant robot arm adapter assembly without departing from the scope of the present invention. It is therefore intended that all matter contained in the above description and as shown in the accompanying drawings shall be interpreted as illustrative and not in a limiting sense. For example, the compliance or the flexibility of the preferred embodiment of the present invention may be adjusted by a proper selection of the spring constants of the springs 125, 145, 160 and 190.

What is claimed and desired to be secured by Letters Patents of the United States is:

1. A compliant adapter assembly useful with an articulatable robot arm requiring an accessory, said adapter assembly comprising:

means for mounting said adapter assembly to said arm, said mounting means having a plate provided with an opening;

a first ring positioned within said opening, means for pivotably connecting said first ring to said mounting means while allowing translation of said first ring with respect to said mounting means, a first spring means positioned between said first ring and said mounting means, a second ring disposed within said first ring, means for pivotably connecting said second ring to said first ring while allowing translation of said second ring with respect to said first ring, a second spring means positioned between said first ring and said second ring, a motor carried by said second ring, said motor having an output shaft;

means for biasing said motor towards a position which is substantially perpendicular to said plate, said biasing means comprising a plurality of orthogonally disposed springs carried between said motor and said plate, and holding means connected to said output shaft for attaching an accessory to said adapter assembly, said holding means being capable of translation along the longitudinal axis of said output shaft.

2. The adapter assembly of claim 1, wherein said first ring pivot means comprises a first pair of pins, each of said first pair of pins being fixed with respect to said first ring, said plate having a first pair of bores axially aligned with said first pair of pins, said first pair of pins being inserted within said first pair of bores and being translatable therein.

3. The adapter assembly of claim 2, wherein said second ring pivot means comprises a second pair of pins, each of said second pair of pins being fixed with respect to said second ring, said first ring having a second pair of bores axially aligned with said second pair of pins, said second pair of pins being inserted within said second pair of bores and being translatable therein.

4. The adapter assembly of claim 3, wherein said first pair of pins is perpendicular to said second pair of pins.

5. The adapter assembly of claims 1 or 4, wherein said first and said second spring means comprises a compressible spring.

6. The adapter assembly of claim 5, wherein a compressible spring is disposed about each pin of said first and second pairs of pins.

7. The adapter assembly of claim 1, wherein said holding means comprises a housing having a first internal bore and a slot, said output shaft being translatable within said first bore whereby said housing may slide upon said output shaft, said output shaft having a pin extending towards said housing into said slot whereby the extent to which said housing may slide upon said shaft may be limited.

* * * * *